(12) United States Patent
Lindner et al.

(10) Patent No.: US 10,192,345 B2
(45) Date of Patent: Jan. 29, 2019

(54) SYSTEMS AND METHODS FOR IMPROVED SURFACE NORMAL ESTIMATION

(71) Applicant: QUALCOMM Incorporated, San Diego, CA (US)

(72) Inventors: Albrecht Johannes Lindner, La Jolla, CA (US); Kalin Mitkov Atanassov, San Diego, CA (US); James Wilson Nash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 15/214,141

(22) Filed: Jul. 19, 2016

(65) Prior Publication Data

US 2018/0025496 A1 Jan. 25, 2018

(51) Int. Cl.
```
G06K 9/00      (2006.01)
G06T 15/04     (2011.01)
G06T 1/20      (2006.01)
G06T 7/00      (2017.01)
G06T 17/00     (2006.01)
```
(52) U.S. Cl.
CPC ............... G06T 15/04 (2013.01); G06T 1/20 (2013.01); G06T 7/0051 (2013.01); G06T 17/00 (2013.01); G06T 2200/04 (2013.01); G06T 2200/08 (2013.01); G06T 2207/10012 (2013.01); G06T 2207/10028 (2013.01); G06T 2210/56 (2013.01)

(58) Field of Classification Search
CPC  G06T 15/04; G06T 7/50; G06T 17/00; G06T 1/20; G06T 2207/10028; G06T 2207/10012; G06T 2200/04; G06T 2210/56; G06T 2200/08
See application file for complete search history.

(56) References Cited

U.S. PATENT DOCUMENTS 5,283,837 A    2/1994  Wood
7,023,432 B2 * 4/2006  Fletcher .................. G06T 17/20
                                                 345/419

(Continued)

FOREIGN PATENT DOCUMENTS

CN    102819864 A    12/2012

OTHER PUBLICATIONS

Berger M., et al., "State of the Art in Surface Reconstruction from Point Clouds", Eurographics star report, Apr. 1, 2014, XP055367964, DOI: 1 0.2312/egst.20141 040 Retrieved from the Internet: URL:https://hal.inria.fr/docs/01/01/77/00/PDF/star_author.pdf [retrieved on Apr. 26, 2017], pp. 161-185.

(Continued)

Primary Examiner — Samir A Ahmed
(74) Attorney, Agent, or Firm — Paradice and Li LLP

(57) ABSTRACT

Methods and systems for surface normal estimation are disclosed. In some aspects, a plurality of images or depth maps representing a three dimensional object from multiple viewpoints is received. Surface normals at surface points within a single image of the plurality of images are estimated based on surface points within the single image. An electronic representation of a three dimensional surface of the object is generated based on the surface normals and a point cloud comprised of surface points derived from the plurality of images.

24 Claims, 12 Drawing Sheets

(56) References Cited

U.S. PATENT DOCUMENTS

| | | | | |
|---|---|---|---|---|
| 8,463,024 B1* | 6/2013 | Gallup | .................... | G06T 7/596 |
| | | | | 345/420 |
| 9,256,980 B2* | 2/2016 | Kirk | ........................ | G06T 15/04 |
| 9,767,598 B2* | 9/2017 | Winder | ................... | G06T 15/04 |
| 2006/0290695 A1* | 12/2006 | Salomie | ................. | G06T 17/20 |
| | | | | 345/420 |
| 2010/0289878 A1 | 11/2010 | Sato et al. | | |
| 2011/0200248 A1* | 8/2011 | Matabosch I Gerones | ................. | |
| | | | | G06K 9/00214 |
| | | | | 382/154 |
| 2013/0004060 A1 | 1/2013 | Bell et al. | | |
| 2013/0181983 A1* | 7/2013 | Kitamura | ............... | G01B 11/24 |
| | | | | 345/419 |
| 2013/0321393 A1* | 12/2013 | Winder | ................... | G06T 15/04 |
| | | | | 345/419 |
| 2013/0321418 A1* | 12/2013 | Kirk | ........................ | G06T 15/04 |
| | | | | 345/423 |
| 2014/0267614 A1 | 9/2014 | Ding et al. | | |

OTHER PUBLICATIONS

International Search Report and Written Opinion—PCT/US2017/033828—ISA/EPO—dated Jul. 26, 2017.

\* cited by examiner

Bad reconstruction from noisy normals due to misalignments of point clouds.

Improved reconstruction from normals computed with proposed method.

SYSTEMS AND METHODS FOR IMPROVED SURFACE NORMAL ESTIMATION

BACKGROUND

Three dimensional surface reconstruction may be based on multiple images and depth maps taken of a three dimensional object. Each of the multiple images and depth maps may be captured from a different viewpoint of the three dimensional object. Point locations on the object may be identified from the images and/or depth maps and used to align the multiple images. An electronic representation of a surface of the three dimensional object may then be created based on the point locations. For example, surface normals at one or more point locations on the surface may be determined. The three dimensional surface between the known surface points may then be estimated based on a neighborhood of surface points and the surface normal estimates. However, in some environments, the resulting three dimensional surface estimation may contain one or more irregularities that reduces the quality of the three dimensional reproduction. Therefore, improved methods of three dimensional surface reconstruction are needed.

SUMMARY

The systems, methods, and devices of this disclosure each have several aspects, no single one of which is solely responsible for its desirable attributes. Without limiting the scope of the disclosure, some aspects of the disclosure are briefly described below.

As discussed above, three dimensional object surface reconstruction may rely on multiple viewpoint images and depth maps to aid in the reconstruction. The reconstruction may include identifying points on the surface of the object being reconstructed. The points may be matched across images to facilitate alignment of the multiple images. Surface normals may be estimated at one or more surface point locations to assist with estimating the orientation of the three dimensional object's surface at the point location. Based on the individual surface orientations at each of the known point locations, the surface between the known surface points may be "filled in" using a variety of techniques, such as interpolating the orientations between surface points to determine the orientation of the object's surface between the known points.

When the multiple viewpoint images are not well aligned, the multiple images may indicate different locations within three dimension space for surface points common to the multiple images. This may result in a general reduction in the accuracy of surface normal estimates that are generated based on the misaligned surface points from different images.

To avoid this problem, the disclosed methods and systems may perform surface normal estimation utilizing only surface points within a single image. By using only on points derived from a single image for estimating a surface normal, the accuracy of surface normal estimation may be substantially improved, especially in environments with relatively large levels of misalignment between the multiple viewpoint images. This may also be the case in low luminance environments. For example, when images of the three dimensional object are captured under low lighting conditions, the accuracy of the surface point locations may suffer. For example, some surface points may not be visible under lower lighting conditions, thus reducing a number of surface points that may be utilized for surface normal estimation. Furthermore, low lighting conditions may cause surface point identification algorithms to perform with less reliability and consistency, resulting in variations in identified surface point locations within each of the multiple viewpoint images. Therefore, under lower luminance conditions, it may be beneficial to estimate surface normals using only surface points derived from a single image.

One aspect disclosed is a method of electronically representing a three dimensional surface for an object. The method includes receiving a plurality of images of the object, the images representing the object from a plurality of viewpoints, identifying points on the surface within each of the plurality of images, generating estimates of surface normals for surface points within each corresponding image based on the surface points within the corresponding image, generating a point cloud comprising surface points from each of the plurality of images; and generating a representation of the three dimensional surface for the object based on the surface normal estimates and the point cloud.

In some aspects, the method includes rendering the representation of the three dimensional surface on an electronic display. In some aspects, the method includes identifying first surface points within a first image of the plurality of images, identifying second surface points within a second image of the plurality of images, generating first estimates of surface normals at first surface point locations based on the first surface points, generating second estimates of surface normals at second surface point locations based on the second surface points, and generating the representation of the three dimensional surface based on the first estimates and second estimates of surface normals.

In some aspects, the method includes filling in the representation of the three dimensional surface between the surface points based on the point cloud, and the first and second surface normal estimates. In some aspects, the method selectively generating the estimates based on one or more of an indication of misalignment between the multiple images and a luminance level of the three dimensional object in the plurality of images. In some aspects, the method includes generating first estimates for surface points within a first image of the plurality of images based on surface points within other images of the plurality of images in response to the misalignment being greater than a threshold, and generating the first estimates for surface points within the first image based on surface points within the single first image in response to the misalignment being lower than the threshold. In some aspects, the method includes generating first estimates for surface points within a first image of the plurality of images based on surface points within other images of the plurality of images in response to the luminance being less than a threshold, and generating the first estimates for surface points within the first image based on surface points within the single first image in response to the luminance being greater than the threshold.

In some aspects, the method includes generating second estimates of surface normals for surface points of a first image of the plurality of images based on surface points identified in multiple images of the plurality of images, comparing the first estimates with the second estimates; and generating the representation of the three dimensional surface in response to the comparison. In some aspects, the method includes estimating a consistency between surface normals of the first estimates and a consistency between surface normals of the second estimates, generating the representation of the three dimensional surface based on the more consistent surface normal estimates.

Another aspect disclosed is an apparatus for electronically representing a surface of a three dimensional object. The apparatus includes an electronic hardware processor, an electronic hardware memory storing instructions that when executed, cause the processor to receive a plurality of images of the object, the images representing the object from a plurality of viewpoints, identify surface points on the surface within each of the plurality of images, generate estimates of surface normals for surface points within each corresponding image based on the surface points within the corresponding image, generate a point cloud comprising surface points from each of the plurality of images; and generate a three dimensional surface for the three dimension object based on the surface normal estimates and the point cloud.

In some aspects, the apparatus includes an electronic display, and the electronic memory stores further instructions that cause the electronic hardware processor to render the three dimensional surface on the electronic display. In some aspects, the electronic hardware memory stores further instructions that cause the electronic hardware processor to: identify first surface points within a first image of the plurality of images, identify second surface points within a second image of the plurality of images, generate first estimates of surface normals at first surface point locations based on the first surface points, generate second estimates of surface normals at second surface point locations based on the second surface points; and generate the surface estimation based on the first estimates and second estimates of surface normals. In some aspects, the electronic hardware memory stores further instructions that cause the electronic hardware processor to fill in the three dimensional surface between the surface points based on the point cloud, and the first and second surface normal estimates.

In some aspects, the electronic hardware memory stores further instructions that cause the electronic hardware processor to selectively generate the first estimates based on one or more of an indication of misalignment between the multiple images and a luminance level of the three dimensional object in the plurality of images. In some aspects, the electronic hardware memory stores further instructions that cause the electronic hardware processor to generate the first estimates for surface points within a first image of the plurality of images based on surface points within other images of the plurality of images in response to the misalignment being greater than a threshold, and generating the first estimates for surface points within the first image based on surface points within the single first image in response to the misalignment being lower than the threshold.

In some aspects, the electronic hardware memory stores further instructions that cause the electronic hardware processor to generate the first estimates for surface points within a first image of the plurality of images based on surface points within other images of the plurality of images in response to the luminance being less than a threshold, and generating the first estimates for surface points within the first image based on surface points within the single first image in response to the luminance being greater than the threshold. In some aspects, the electronic hardware memory stores further instructions that cause the electronic hardware processor to: generate second estimates of surface normals for each of the first points based on the point cloud, compare the first estimates with the second estimates; and generate the surface estimation in response to the comparison. In some aspects, of the apparatus, the electronic hardware memory stores further instructions that cause the electronic hardware processor to: estimate a consistency between surface normals of the first estimates and a consistency between surface normal of the second estimates, and generate the surface estimation based on the more consistent surface normal estimates.

Another aspect disclosed is a non-transitory computer readable storage medium comprising instructions that when executed cause an electronic hardware processor to perform a method of generating an electronic representation of a three dimensional surface of an object.

The method of the computer readable storage medium includes receiving a plurality of images of the object, the images representing the object from a plurality of viewpoints, identifying surface points on the surface within each of the plurality of images, generating estimates of surface normals for surface points within each corresponding image based on the surface points within the corresponding image, generating a point cloud comprising surface points from each of the plurality of images; and generating a representation of the three dimensional surface for the object based on the surface normal estimates and the point cloud.

In some aspects, the method of the computer readable storage medium includes rendering the representation of the three dimensional surface on an electronic display. In some aspects, the method includes identifying first surface points within a first image of the plurality of images, identifying second surface points within a second image of the plurality of images, generating first estimates of surface normals at first surface point locations based on the first surface points, generating second estimates of surface normals at second surface point locations based on the second surface points, and generating the representation of the three dimensional surface based on the first estimates and second estimates of surface normals.

In some aspects, the method of the computer readable storage medium includes filling in the representation of the three dimensional surface between the surface points based on the point cloud, and the first and second surface normal estimates. In some aspects, the method selectively generating the estimates based on one or more of an indication of misalignment between the multiple images and a luminance level of the three dimensional object in the plurality of images. In some aspects, the method includes generating first estimates for surface points within a first image of the plurality of images based on surface points within other images of the plurality of images in response to the misalignment being greater than a threshold, and generating the first estimates for surface points within the first image based on surface points within the single first image in response to the misalignment being lower than the threshold. In some aspects, the method of the computer readable storage medium includes generating first estimates for surface points within a first image of the plurality of images based on surface points within other images of the plurality of images in response to the luminance being less than a threshold, and generating the first estimates for surface points within the first image based on surface points within the single first image in response to the luminance being greater than the threshold.

In some aspects, the method of the computer readable storage medium includes generating second estimates of surface normals for surface points of a first image of the plurality of images based on surface points identified in multiple images of the plurality of images, comparing the first estimates with the second estimates; and generating the representation of the three dimensional surface in response to the comparison. In some aspects, the method includes estimating a consistency between surface normals of the first estimates and a consistency between surface normals of the second estimates, generating the representation of the three dimensional surface based on the more consistent surface normal estimates.

Another aspect disclosed is an apparatus for electronically representing a surface of a three dimensional object. The apparatus includes a means for receiving a plurality of images of the object, the images representing the object from a plurality of viewpoints, identify surface points on the surface within each of the plurality of images, means for generating estimates of surface normals for surface points within each corresponding image based on the surface points within the corresponding image, means for generating a point cloud comprising surface points from each of the plurality of images; and means for generating a three dimensional surface for the three dimension object based on the surface normal estimates and the point cloud.

Another aspect disclosed is an apparatus for improved rendering of three dimensional objects on a computer, the apparatus includes means for estimating surface normals responsive to a misalignment between multiple images representing the three dimensional object, and means for generating the surface of the three dimensional object based on the surface normals. This aspect may also include means for writing the generated surface to a data store.

Another aspect disclosed is an apparatus for improved rendering of three dimensional objects on a computer, the apparatus includes means for estimating surface normals responsive to a luminance of the three dimensional object across multiple images representing the three dimensional object, and means for generating the surface of the three dimensional object based on the surface normals. This aspect may also include means for writing the generated surface to a data store.

BRIEF DESCRIPTION OF THE DRAWINGS

The various features illustrated in the drawings may not be drawn to scale. Accordingly, the dimensions of the various features may be arbitrarily expanded or reduced for clarity. Furthermore, dotted or dashed lines and objects may indicate optional features or be used to show organization of components. In addition, some of the drawings may not depict all of the components of a given system, method, or device. Finally, like reference numerals may be used to denote like features throughout the specification and figures.

DETAILED DESCRIPTION

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Furthermore, although particular aspects are described herein, many variations and permutations of these aspects fall within the scope of the disclosure. In addition, the scope of the disclosure is not intended to be limited to particular the benefits, uses, or objectives disclosed herein. Rather, aspects of the disclosure are intended to be broadly applicable to different wired and wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Figure 1:
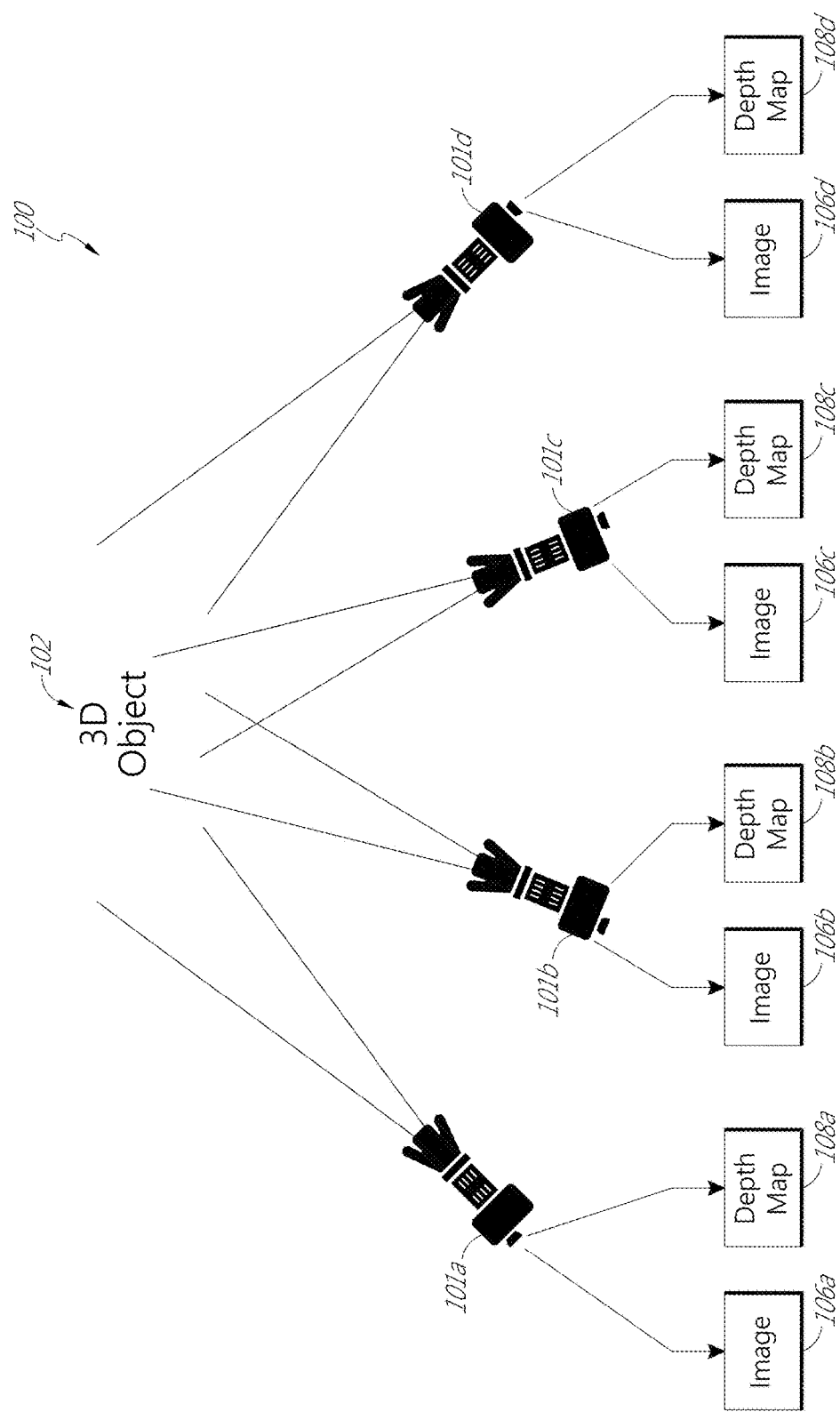
FIG. 1 illustrates an example of capturing multiple viewpoint images and multiple depth maps of a scene, including a three dimensional object.

FIG. 1 shows an example of the capture of multiple viewpoint images and multiple depth maps of a scene including a three dimensional object 102. Four imaging devices 101a-d are shown. Each of the four imaging devices 101a-d captures an image of the three dimensional object 102, resulting in four images 106a-d. Each of the imaging devices 101a-d may also utilize one or more depth sensing technologies to obtain a depth map of the three dimensional object, shown as depth maps 108a-d. For example, in some aspects, the imaging devices 101a-d may utilize structured light to generate depth maps 108a-d of the three dimensional object. In some other embodiments, some of the imaging devices 101a-d may be equipped with a light detection and ranging (LIDAR) depth sensor. In some aspects, some of the imaging devices 101a-d may utilize time of flight methods for depth sensing. In some aspects, the imaging devices 101a-d may be a single imaging device. For example, in some aspects, a user (not shown) may position a single imaging device at various viewpoints around the three dimensional object 102 (for example, at the viewpoints illustrated by the four imaging devices 101a-d) and capture images 106a-d and depth maps 108a-d using the single imaging device. In some embodiments, the image capture of the three dimensional object 102 using the single imaging device can be done sequentially, for example, moving the single imaging device to the locations indicated by imaging device 101a, 101b, 101c, and 101d in order. In other embodiments, the single imaging device may be positioned at various places around the three dimensional object 102 and the images captured in any order.

Figure 2:
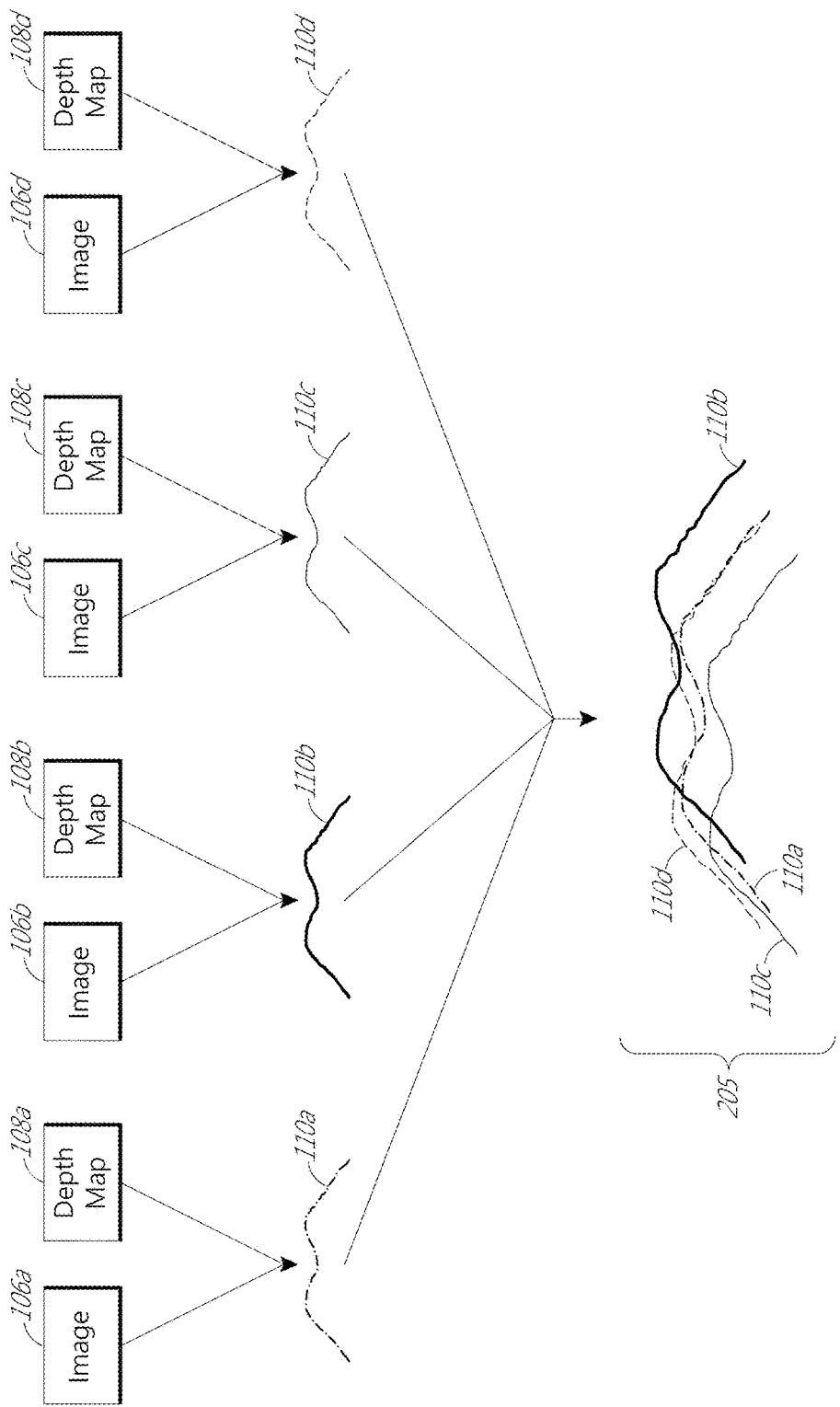
FIG. 2 illustrates an example of multiple sets of surface points derived from multiple viewpoint images and multiple depth maps representing a three dimensional object.

FIG. 2 is a data flow diagram of a process to determine sets of points on a surface of the three dimensional object of FIG. 1 based on multiple viewpoint images. The images 106a-d and depth maps 108a-d generated by the devices 101a-d of FIG. 1 may be utilized to determine surface point sets 110a-d. Each surface point within each of the surface point sets 110a-d approximates a position of the surface of the three dimensional object 102 from the perspective of its originating image 106a-d and depth map 108a-d.

In some aspects, locations of the surface points within each of the surface point sets 110a-d may be derived from information in the respective depth map 108a-d. The three dimensional locations of surface points from each of the four images may then be mapped onto a common three dimensional space, as shown by 205 in FIG. 2. However, the four images 106a-d and depth maps 108a-d from which the surface points 110a-d are generated may be subject to errors in alignment. For example, variations in pitch, yaw, or roll of an imaging device may result in perspective errors between two or more images of the same three dimensional object. Similarly, offsets in an X, Y, and Z axis within the common three dimensional space may not be properly accounted for when surface points from multiple images are mapped into the common three dimensional space 205. As a result, calculated positions of surface points common between two images within a single three dimensional space may vary to some degree. Furthermore, a relative location of different surface points from different images in a single three dimensional space may not accurately reflect the relative position of surface features of the actual three dimensional object in the region of the surface points due to this misalignment. An example of the type of misalignment that may occur is shown in FIG. 2 as the variation in the surface contours across the surface point sets 110a-d within the three dimensional space 205.

Figure 3A:
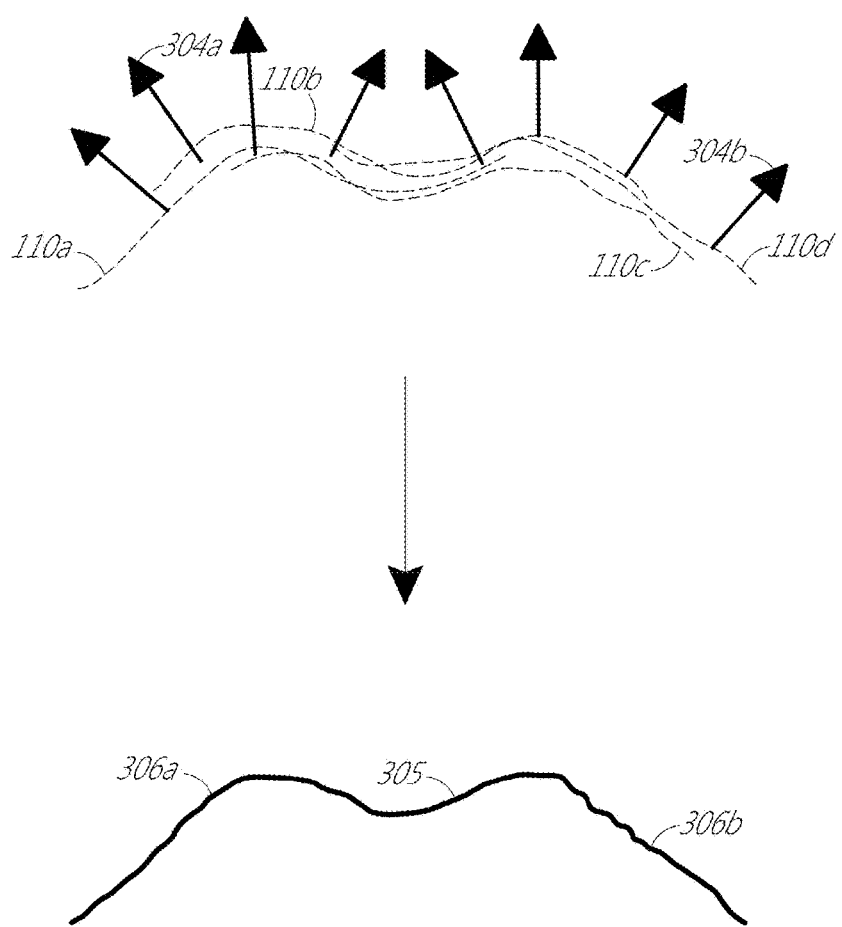
FIG. 3A illustrates an example of an overview of an embodiment of surface normal estimation using a point cloud from multiple viewpoint images.

FIG. 3A shows the generation of surface normals based on the surface point sets 110a-d discussed above with respect to FIG. 2. As part of a surface reconstruction of the three dimensional object, the surface point sets 110a-d may be utilized to generate surface normal estimates. The surface normals are shown as the arrows in FIG. 3A (only two surface normal estimates are indicated as 304a-b to preserve figure clarity). In some aspects, a surface normal of a point on the surface of the three dimensional object may be estimated by analyzing eigenvectors and Eigen values (or PCA—Principal Component Analysis) of a covariance matrix created from nearest neighboring surface points of the surface point for which a normal is being estimated.

After the surface normals (e.g. 304a-b) have been estimated, the three dimensional surface 305 may be estimated based in part on the surface normals 304a-b. However, because the estimation of the surface normals 304a-b may be subject to error introduced by the misalignment between the surface point sets 110a-d as discussed earlier, the reconstructed three dimensional surface 305 may include one or more discontinuities 306a-b.

Figure 3B:
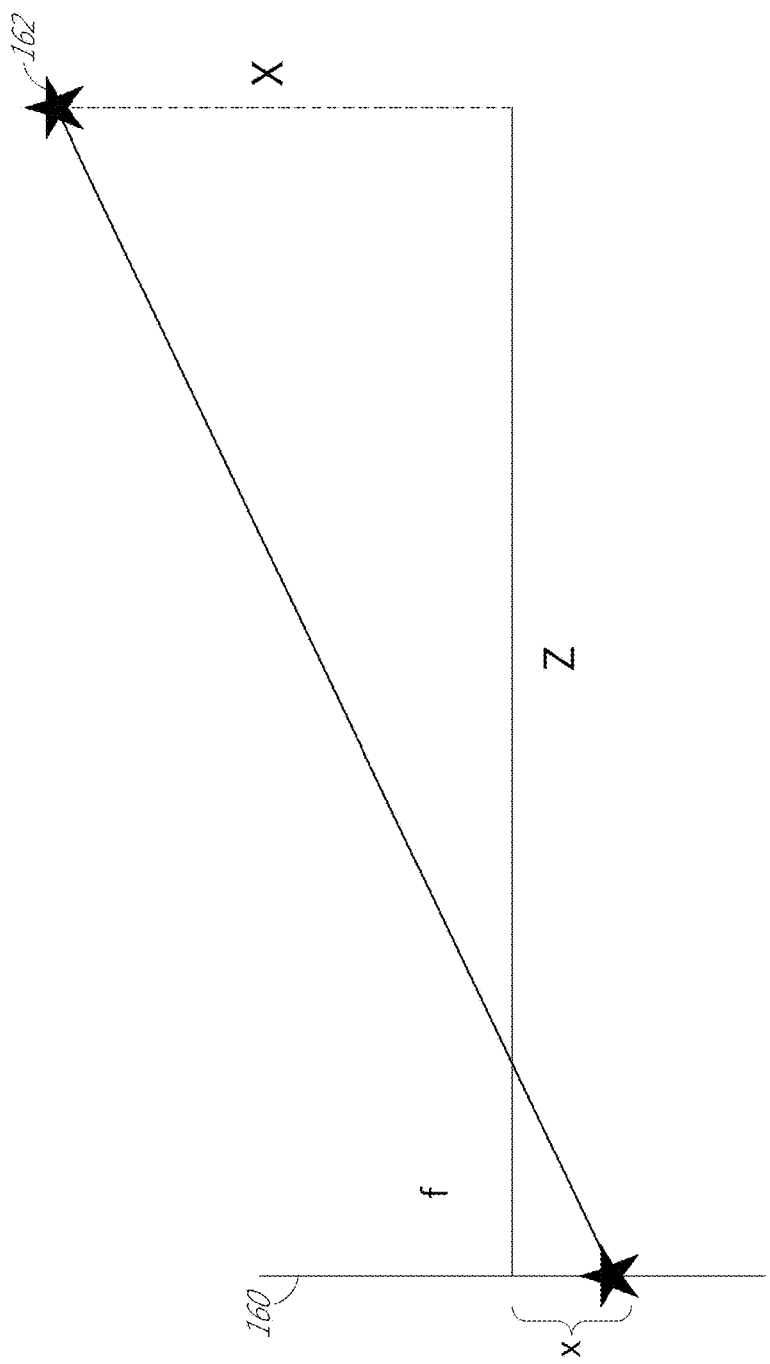
FIG. 3B illustrates an example of an overview of an embodiment of surface normal estimation using surface points from a single viewpoint image.

FIG. 3B shows an exemplary method for determining a three dimensional surface point position based on image data and a depth map. The depth map may provide depth values for each pixel in the image data. The depth value for a particular pixel Z represents a distance from an image sensor plane 160 of an imaging sensor of an imaging device (for example, imaging device 101a FIG. 1) to a surface of a three dimensional object (for example, three dimensional object 102 FIG. 1).

As shown in FIG. 3B, f is a focal length of the imaging sensor, Z is a depth of a surface point from the image sensor plane 160 of an imaging sensor to the surface point 162 of the three dimensional object. In FIG. 3B, x represents an offset from an optical axis of the imaging sensor to a location of the surface point on the sensor plane in the "X" dimension. The X coordinate of the surface point 162 can be computed as X=Z*f/x. The Y coordinate is analogous yielding a point with 3D coordinates (X, Y, Z). In some other aspects, stereo vision provided by multiple images of the three dimensional object from different viewpoints may be utilized to obtain coordinates of surface points within a three dimensional space. In these aspects, a depth map may not be necessary.

Figure 4:
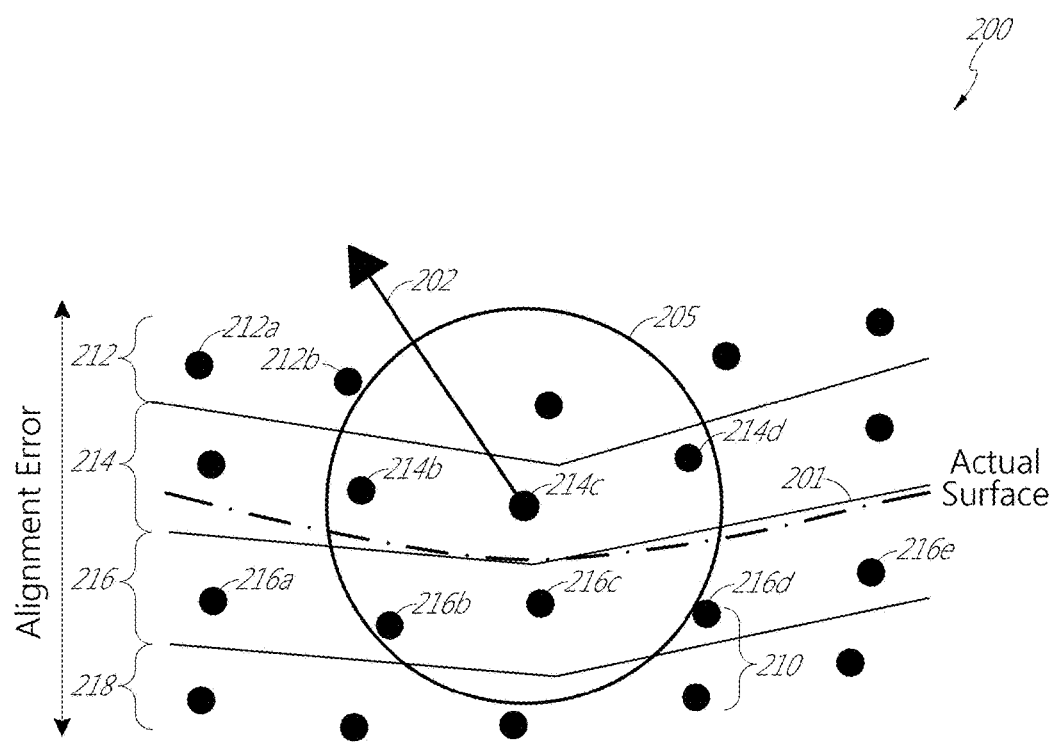
FIG. 4 illustrates an example of using surface points from multiple viewpoint images when estimating a surface normal.

FIG. 4 shows a surface 201 of a three dimensional object and four sets of surface points 212, 214, 216, and 218 approximating the surface 201. While the surface 201 and the sets of surface points 212, 214, 216, and 218 are shown in two dimensions in FIG. 2, the disclosed embodiments are generally directed to estimating three dimensional surfaces and surface point approximations of same. The four (4) sets of surface points 212, 214, 216, and 218 may be derived from four different viewpoint images respectively and/or four different depth maps respectively, as discussed above with respect to FIG. 2. Differences between corresponding surface point locations in each of the sets of surface points 212, 214, 216, and 218, as shown for example by difference 210, may be introduced by misalignment between the four viewpoint images from which each of surface point sets 212, 214, 216, and 218 are derived.

As part of a surface reconstruction of a three dimensional object, surface normals for the three dimensional object may be estimated based on the multiple viewpoint images from which the surface point sets 212, 214, 216, and 218 are derived. For example, a surface normal 202 may be estimated for the surface point 214c, which is part of surface point set 214. Estimation of the surface normal 202 may utilize a "nearest neighbor" method, in that a set of other surface points 212b, 214b, 214d, and 216b within a neighborhood 205 may be utilized when estimating the surface normal 205. For example, surface points within a threshold distance of the point 214c (represented by the circle 205) may be used for surface normal estimation, while surface points further than the threshold distance of the point 214 may not be utilized for estimation of a surface normal at the surface location of point 214. For example, surface points not within the neighborhood 205, such as surface points 212a, 216a, 216d, 216e, among others, may not be utilized when estimating the surface normal 202. Since the neighborhood 205 encompasses some surface points from each of surface point sets 212, 214, and 216, surface points approximating the actual surface 201 and derived from different viewpoint images are used when estimating the surface normal 202. Since the collection of viewpoint images from which the surface point sets 212, 214, and 216 are derived may not be perfectly aligned, the surface points 212, 214, 216, and 218 may also include relative misalignments. This misalignment between the sets of surface points may adversely affect estimation of the surface normal 202.

Figure 5:
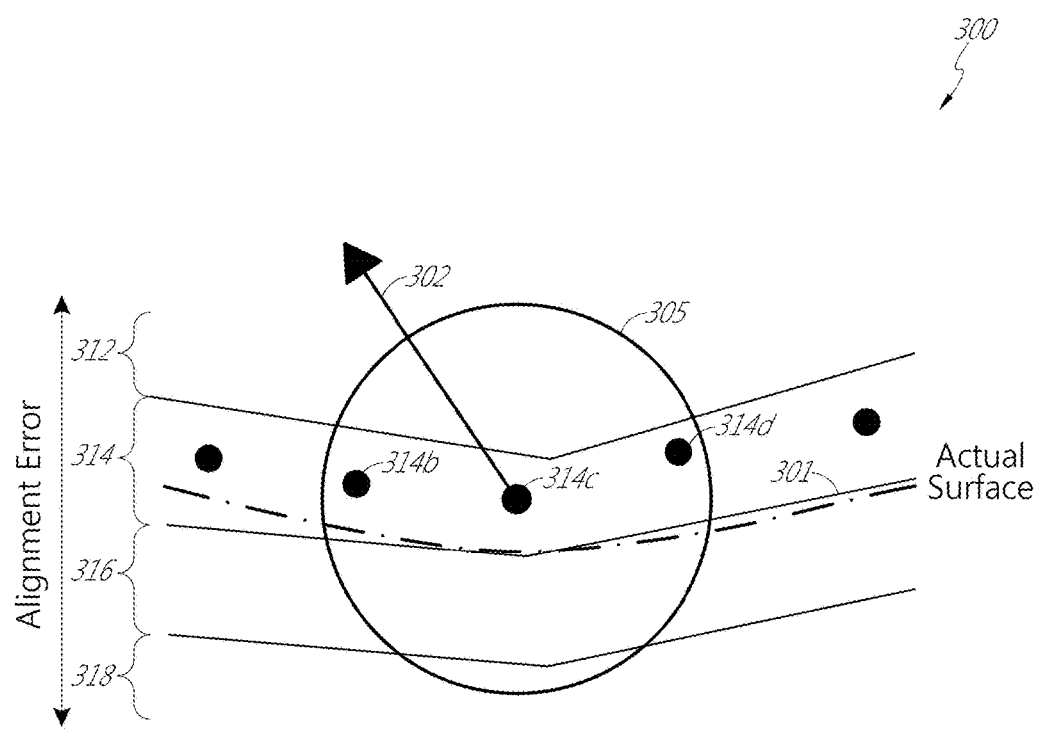
FIG. 5 illustrates an example of using surface points derived from a single image when estimating surface normals for surface points within the single image.

FIG. 5 shows the use of surface points derived from a single image and corresponding depth map when estimating surface normals for surface points within the single image. FIG. 5 is similar to FIG. 4, except in FIG. 5, the surface normal 302 arising from surface point 314c is estimated using only surface points within the set of surface points 314, which are derived from a single viewpoint image and/or corresponding depth map. Other surface point sets 312, 316, and 318 are not considered when estimating the surface normal 302. Individual surface points within each of sets 312, 316, and 318 are not shown in FIG. 5 to illustrate they are not considered when estimating the surface normal 302. By restricting the estimation of surface normal 302 to surface points derived from a single viewpoint image and/or corresponding depth map, the estimate of surface normal 302 is not dependent on alignment of the multiple viewpoint images 106a-d, as it was in the example surface normal estimation discussed above with respect to FIG. 4.

Figure 6A:
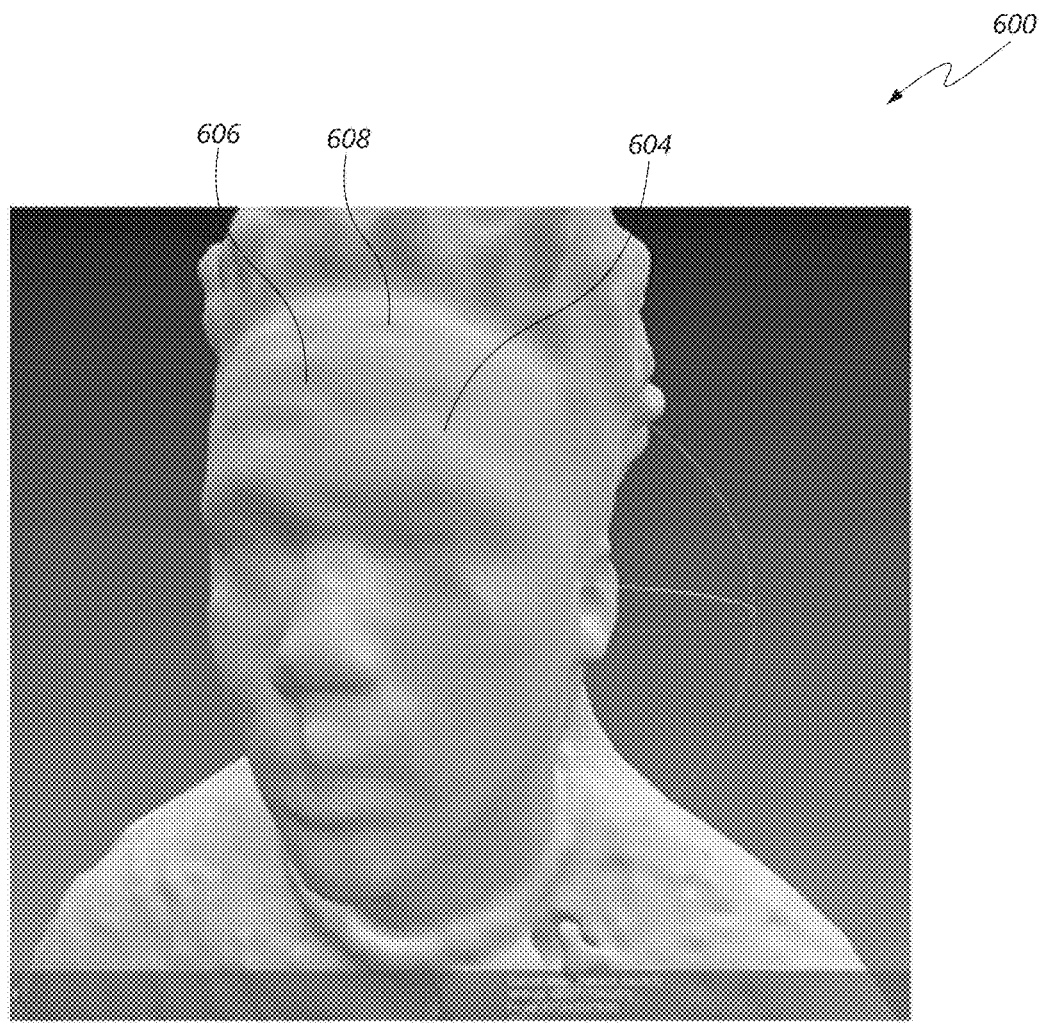
FIG. 6A shows an example of a surface reconstruction utilizing surface normals estimated using a point cloud formed from multiple viewpoint images.

FIG. 6A shows a surface reconstruction utilizing surface normals estimated using a point cloud derived from multiple viewpoint images. The surface reconstruction 600 in FIG. 6A shows discontinuities in the surface reconstruction 600. For example, a forehead 604 in the reconstruction 600 includes discontinuities 606 and 608, which may be caused by errors in surface normal estimates that utilized surface points from multiple viewpoint images that were not adequately aligned.

Figure 6B:
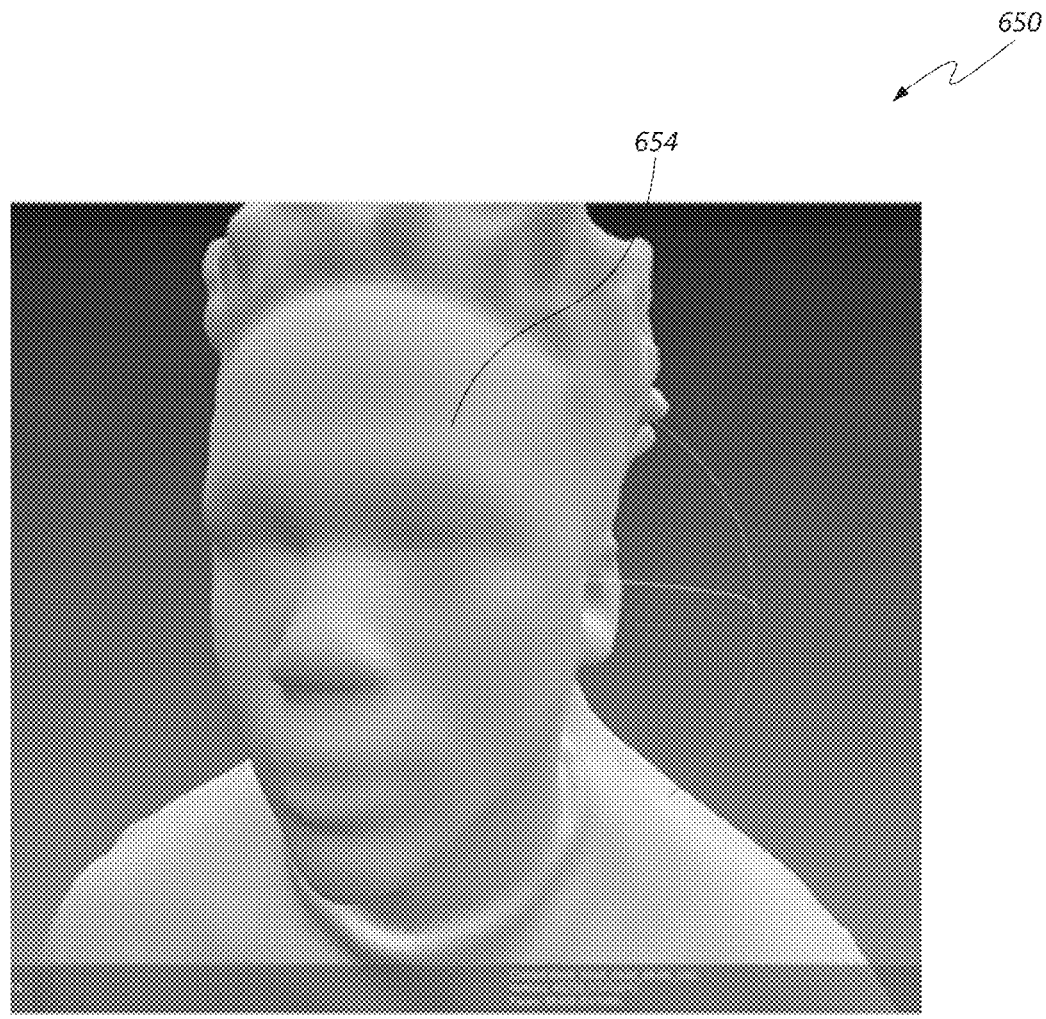
FIG. 6B shows an example of a surface reconstruction utilizing surface normals estimated using surface points from a single viewpoint images.

FIG. 6B shows a surface reconstruction utilizing surface normals estimated using surface points derived from a single viewpoint image and/or corresponding depth map. As shown, the surface reconstruction 650 shows a smooth forehead 654 without the discontinuities present in surface reconstruction 600, which, as discussed above with respect to FIG. 6A, is based on surface normals estimated from surface points derived from multiple viewpoint images.

Figure 7:
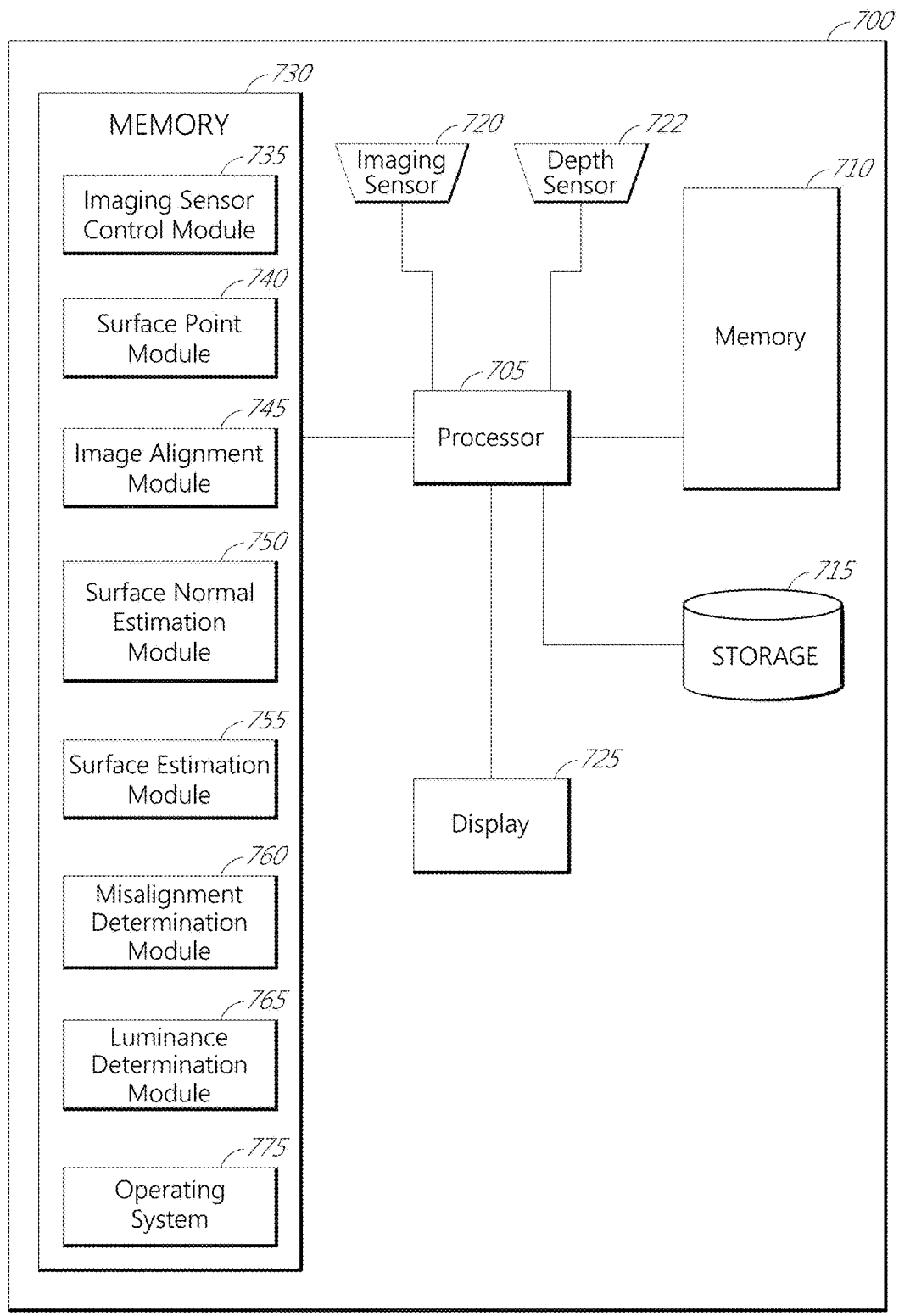
FIG. 7 illustrates a block diagram of an example of a device for three dimensional surface reconstruction.

FIG. 7 is a block diagram of an exemplary device 700 for three dimensional surface reconstruction. The device 700 includes an electronic hardware processor 705, an electronic hardware memory 710, stable storage 715, imaging sensor 720, depth sensor 722, display 725, and second memory 730. In some aspects, the electronic hardware memory 710 and second electronic hardware memory 730 may be the same memory.

The memory 730 stores instructions that configure or cause the processor 705 to perform one or more of the functions discussed below. The instructions stored in the memory 730 may, in some aspects be grouped or logically organized into modules. For example, the memory 730 may include an imaging sensor control module 735, which includes instructions that enable the processor 705 to capture images using the imaging sensor 720. A surface point module 740 may store instructions that configure the processor 705 to identify one or more surface points in an image captured by the imaging sensor 720. The surface point module 740 may also identify the surface points using information from the depth sensor 722. Instructions in the surface point module 740 may also configure the processor 705 to determine a location of each of the identified surface points within a unified three dimensional space, as discussed above with respect to FIGS. 2-3. Instructions in an image alignment module 745 may configure the processor 705 to align multiple images captured by the imaging sensor 720. For example, in some aspects, the methods disclosed may capture multiple images of a three dimensional object from multiple viewpoints. These multiple viewpoint images may be aligned to provide correlation between surface points found in at least two of the multiple viewpoint images.

Instructions in the surface normal estimation module 750 may configure or cause the processor 705 to estimate one or more surface normals within an image captured by the imaging sensor 720. In some aspects, the surface normal estimation may be based on surface points identified by the surface point module 740. In some aspects, the surface points used for a particular surface normal estimate may be based only on surface points from a single image. This may reduce the estimates susceptibility to error caused by misalignment between multiple images captured by the imaging sensor 720. In some aspects, the surface normal estimation module 750 may estimate a surface normal based on surface points identified in multiple viewpoint images. For example, in some aspects, if a misalignment between multiple viewpoint images is below a threshold, then surface points from multiple viewpoint images may be utilized to estimate a surface normal, whereas is the misalignment is above the threshold, a surface normal may be estimated using surface points identified in only a single viewpoint image.

Instructions in a surface estimation module 755 may configure or cause the processor 705 to estimate a surface of a three dimensional object represented by one or more images captured by the imaging sensor 720. For example, the instructions in the surface estimation module 755 may determine surface positions between surface points identified by the surface point module 740 based on the surface normals estimated by the surface estimation module 755 and the surface points.

Instructions in a misalignment determination module 760 may configure or cause the processor 705 determine a level of misalignment between multiple images captured by the imaging sensor 720. For example, the misalignment may be determined based on differences in positions between corresponding key points in each of the images being analyzed. In some aspects, the misalignment may be proportional to the average, median, or maximum distance between corresponding key points.

Instructions in the luminance determination module 765 may configure or cause the processor 705 to determine a level of luminance of the three dimensional object represented by one or more images captured by the imaging sensor 720. The luminance determined by the module 765 may be used to determine whether the surface normal estimation module 755 should perform its estimation based on surface points from a single image or multiple images.

Instructions in the operating system 775 may configure or cause the processor 705 to perform basic functions of the device 700, such as task management and input/output.

Figure 8:
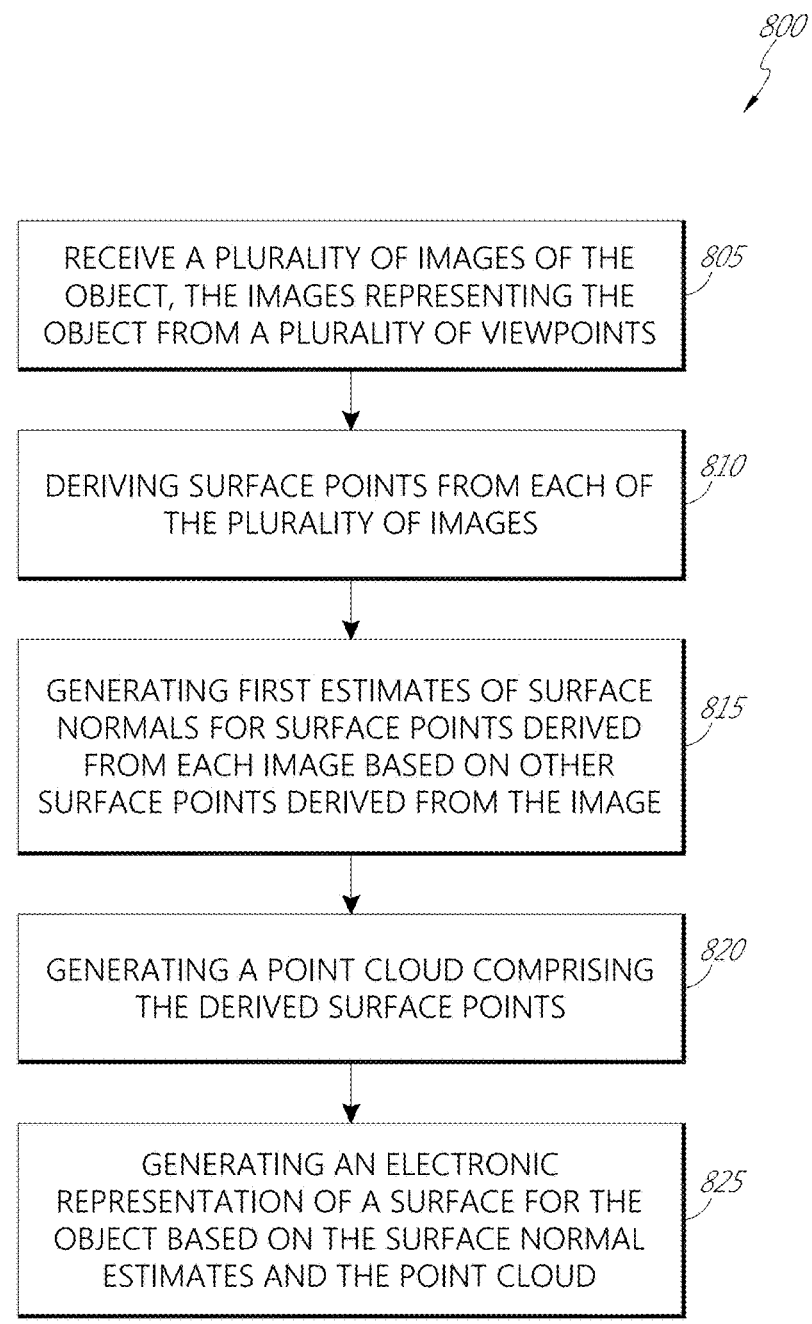
FIG. 8 is a flowchart illustrating an example of an embodiment of a method for three dimensional surface reconstruction.

FIG. 8 is a flowchart of an exemplary method for three dimensional surface reconstruction. In some aspects, the method 800 may be performed by the processor 705 discussed above with respect to FIG. 7. For example, in some aspects, instructions in one or more of the modules discussed with respect to FIG. 7 may configure the processor 705 to perform one or more of the functions discussed below.

In block 805, a plurality of images are received. The images may include a representation of the three dimensional object from a plurality of viewpoints. In some aspects, the plurality of images may be received from the imaging sensor 720. In some aspects, the plurality of images may be received from the storage 715. In some aspects, the plurality of images may be received from a computer network, for example, from a network attached storage or cloud based storage system. In some aspects, block 805 may alternatively include receiving a plurality of depth maps instead of or in addition to the plurality of images. The depth maps may be received, in some aspects, from information derived from the depth sensor 722 shown in FIG. 7. In some aspects of block 805, both the plurality of images and the plurality of corresponding depth maps may be received.

In block 810, surface points on the surface of the object are identified or derived from each of the plurality of images and/or depth maps. For example, in some aspects, the surface points may be derived from depth information provided in one or more depth maps received in block 805.

Locations within a three dimensional space of each surface point are also determined in block 810. As discussed above with respect to FIGS. 2 and 3A, locations of surface points within three dimensional space may be determined based on the images received in block 805, and a depth map, which may be generated for example, via the use of structured light or a LIDAR unit.

The results of block 810 may include, for example, surface points associated with each of the plurality of images. Surface points may define a location in three dimensional space (for example, an X, Y, and Z value). For example, as shown in FIG. 2, block 810 may include the determination of a first set of surface points from a first image, such as surface point set 212 of FIG. 4, and a determination of a second set of surface points from a second image, such as those in surface point set 214 of FIG. 4.

In block 815, a surface normal at a surface point's position on the three dimensional object may be estimated based on other surface points of the three dimensional object. In some aspects, the surface normal may be estimated by taking a vector cross product of two non-parallel edges of a triangle formed by at least three surface points on the surface of the three dimensional object in three dimensional space. In some aspects, multiple triangles (i.e. multiple sets of at least three surface points on the surface of the three dimensional object) may be identified from a plurality of surface points within the three dimensional space. The vector cross products of two edges of each of the identified triangles (sets of surface points) (i.e. multiple normals) may be averaged to determine the surface normal in some aspects of block 815.

Block 815 restricts determination of the surface normal at a location of a surface point identified in a first image and/or first depth map to other surface points derived from the first image and/or corresponding first depth map, and does not utilize surface points identified from other images and/or other depth maps (taken from different perspectives). For example, referring back to FIG. 2, block 815 might determine a surface normal for surface point 216b based only on surface points 216a, and 216c-e. Block 815 would not utilize any surface points from surface point sets 212, 214, or 218 in its determination of surface normals at locations corresponding to surface points within set 216.

By relying on surface points derived from a single image and/or depth map for surface normal estimates, block 820 avoids errors in surface normal estimates that may result from relying on misaligned surface points from multiple viewpoint images and/or depth maps.

In some aspects, block 815 may determine multiple surface normals at multiple locations of the three dimensional object corresponding to locations of multiple surface points within the first image in a similar manner as that described above. For example, some aspects of block 815 also include generating second surface normals at locations of surface points derived from a second image. Estimation of these second surface normals may be restricted to use of other surface point locations derived from the second image, and may not utilize surface points derived from, for example, the first image discussed above.

In block 820, a point cloud is generated that includes surface points derived from each of the plurality of images and/or depth maps. Generating a point cloud may not require any particular operation, but may be only a conceptual portion of process 800. The point cloud discussed here includes surface points derived from multiple viewpoint images and/or depth maps. For example, the point cloud may include surface points collectively derived from two, three, four, five, six, seven, eight, nine, ten, or one hundred (100) images and/or depth maps, or any number of images and/or depth maps.

In block 825, an electronic representation of the surface for the three dimensional object is generated based on the surface normal estimates determined in block 820 and the point cloud. For example, block 825 may utilize one or more of polygonal modeling, curve modeling, or digital sculpting to generate the surface estimation of the three dimensional object.

In some aspects, the surface can be reconstructed by estimating a volumetric indicator function V(x,y,z) that is equal to one (1) inside the object and zero (0) everywhere else. The object surface is then the level surface of this indicator function, for example V=0.5. The indicator function can be estimated from points $p_i$ and normals $n_i$ through an energy minimization algorithm. The energy term forces the derivatives of the indicator function at the locations to be as close as possible to the normal: $\nabla V(p_i) = n_i$, where $\nabla$ is a gradient operator.

Some approaches to surface reconstruction use global or local approaches to approximating a surface. Global approaches may define an implicit function as a sum of radial basis functions, centered at the points on the surface. However, ideal radial basis functions are globally supported and non-decaying, so a resulting solution matrix may be dense and ill-conditioned. Local fitting methods consider subsets of nearby points. For example, they may estimate tangent planes and define an implicit function based on the signed distance to the tangent plane of the closest point. Signed distance can also be accumulated into a volumetric grid. The influence of several nearby points can be blended together, for instance using moving least squares. A different approach is to form point neighborhoods by adaptively subdividing space, for example, with an adaptive octree.

Other methods of surface reconstruction are based on combinatorial structures, such as alpha shapes, Delaunay triangulations, or Voronoi diagrams. These approaches may create a triangle mesh that interpolates all or most of points present on the surface. These approaches suffer in the presence of noisy data, which results in a surface which may be jagged. The surface may be smoothed in subsequent processing.

Data defining the electronic representation may be stored to a data store, or used to render an image of the electronic representation on an electronic display, such as the display 725 of FIG. 7.

Some aspects of process 800 include storing data representing the surface estimation to a stable storage, displaying the surface estimation on an electronic display, or transmitting data representing the surface estimation over a computer network to a separate computer, which receives and processes the data further.

Figure 9:
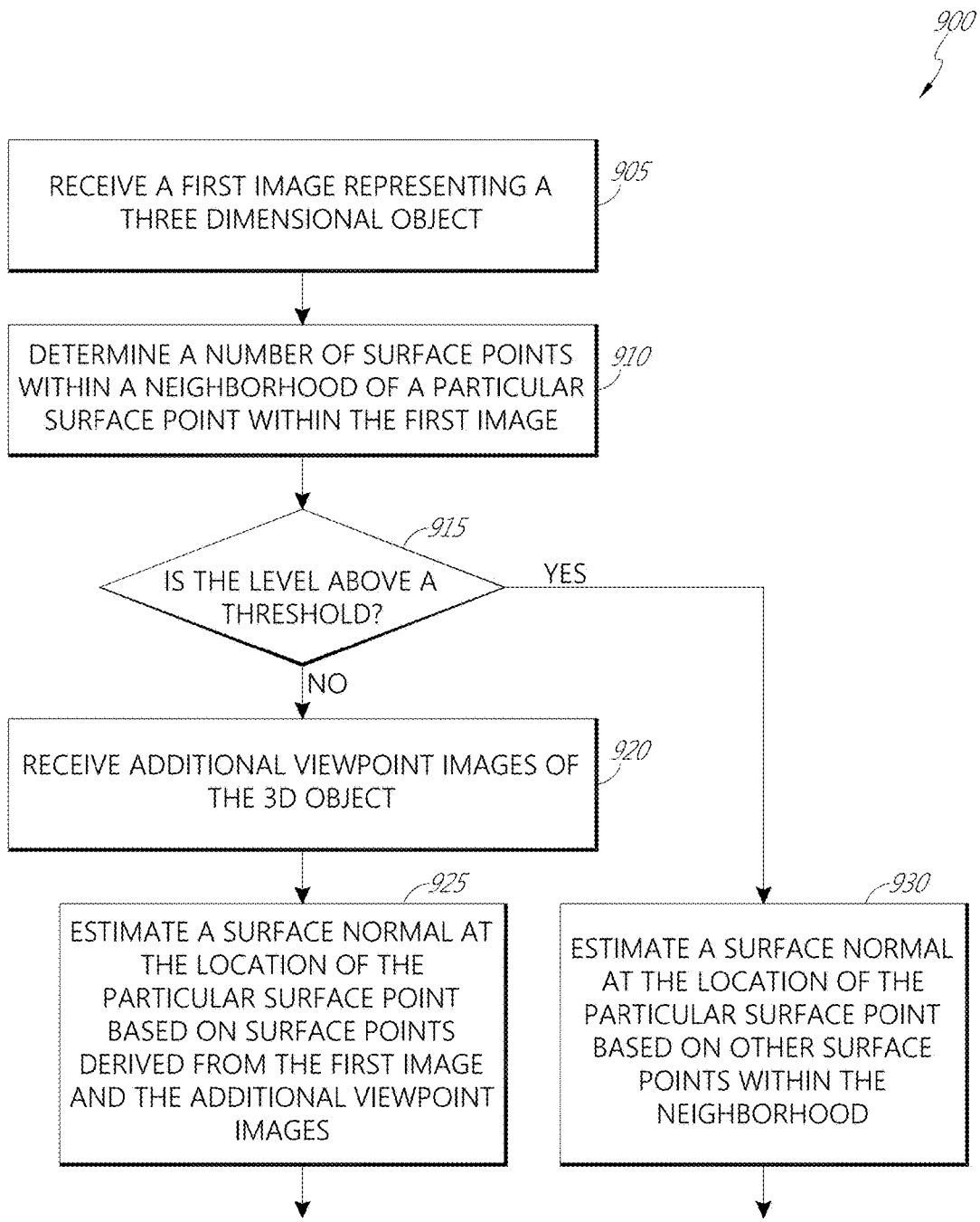
FIG. 9 is a flowchart illustrating an example of an embodiment of a method for three dimensional surface reconstruction.

FIG. 9 is a flowchart of an exemplary process for three dimensional surface reconstruction. In some aspects, the process 900 may be performed by the device 700, discussed above with respect to FIG. 7. For example, instructions in one or more of the modules discussed above with respect to FIG. 7 may configure the processor 705 to perform one or more of the functions discussed below. In some aspects, process 900 may operate for one or more surface normals generated during a surface reconstruction. The surface reconstruction may then be performed based on the one or more surface normals.

In block 905, a first image representing a three dimensional object is received. In some aspects, the image may be received from the imaging sensor 720. In other aspects, the image may be received from the stable storage 715. In some other aspects, the image may be received from a computer network. In some aspects, block 905 may alternatively include receiving a depth map representing the first image. In some aspects of block 905, both a visual image and a depth map are received.

In block 910, a number of surface points within a neighborhood of a particular surface point within the first image is determined. For example, as discussed above with respect to FIGS. 4 and 5, surface points within a threshold distance of the particular surface point may be used when estimating a surface normal at a location of the particular surface point. Because portions of the depth map may be missing or invalid, some surface points may be missing from the neighborhood surrounding the particular surface point. Unless the number of surface points within the neighborhood is sufficient, it may not be possible to estimate a surface normal for the location of the particular surface point at a reasonable level of accuracy.

Decision block 915 compares the number of surface points determined in block 915 to the threshold. If the number is above the threshold, then process 900 moves to block 930, where the surface normal at the location of the particular surface point is estimated based on other surface points derived from the first image. As discussed above, in some aspects, the surface normals may be estimated by taking a vector cross product of two edges of a triangle formed by at least three surface points on the surface of the three dimensional object in three dimensional space. In some aspects, multiple triangles (i.e. multiple sets of at least three surface points on the surface of the three dimensional object) may be identified from a plurality of surface points within the three dimensional space. The vector cross products resulting from each of the identified triangles (sets of surface points) may be averaged to determine the surface normal in some aspects. In some aspects, block 915 may operate similarly to block 815, discussed above with respect to FIG. 8. Block 930 may not utilize surface points derived from other viewpoint images and/or depth maps beyond those received in block 905 (i.e. only surface points derived from the same image and/or depth map used to derive the particular surface point may be utilized).

If the number of surface points within the neighborhood is below the threshold, block 920 receives one or more additional viewpoint images and/or corresponding depth maps of the three dimensional object. Each of the additional one or more viewpoint images and/or depth maps includes a representation of the same three dimensional object, but from a different perspective than the first image. For example, the additional viewpoint image(s) may represent the three dimensional object from a different position on a X, Y, or Z axis, with the center of the object positioned at the intersection of the X, Y, and Z axis in some aspects.

In block 925, the surface normal at the location of the particular surface point is estimated based on surface points derived from the first image and other surface points derived from the additional viewpoint image(s) and/or depth maps received in block 920. By utilizing surface points from multiple images (such as those received in the combination of block 905 and 920), the number of surface points used to estimate the surface number may be greater than the threshold referenced in decision block 915.

As discussed above, in some aspects, the surface normals may be estimated by taking a vector cross product of two edges of a triangle formed by at least three surface points on the surface of the three dimensional object in three dimensional space. In some aspects, multiple triangles (i.e. multiple sets of at least three surface points on the surface of the three dimensional object) may be identified from a plurality of surface points within the three dimensional space. The vector cross products resulting from each of the identified triangles (sets of surface points) may be averaged to determine the surface normal in some aspects. In some aspects, block 925 may operate similarly to block 815, discussed above with respect to FIG. 8.

Process 900 may also include estimating a surface of the three dimensional object based on the surface normals estimated in blocks 925, or 930. For example, process 900 may include blocks 820 and 825, as discussed above with respect to FIG. 8. In some aspects, process 900 may be performed multiple times during surface estimation. For example, process 900 may be performed for each surface normal used in a surface reconstruction. In some aspects, after the estimation of the surface of the three dimension object is completed, process 900 may write the representation to an output device. For example, the output device may be a stable storage, such as storage 715, a display, such as display 725, or a network in some aspects. For example, process 900 may transmit the estimation or representation over a network to a remote device, such as a remote data store or other remote device.

Figure 10:
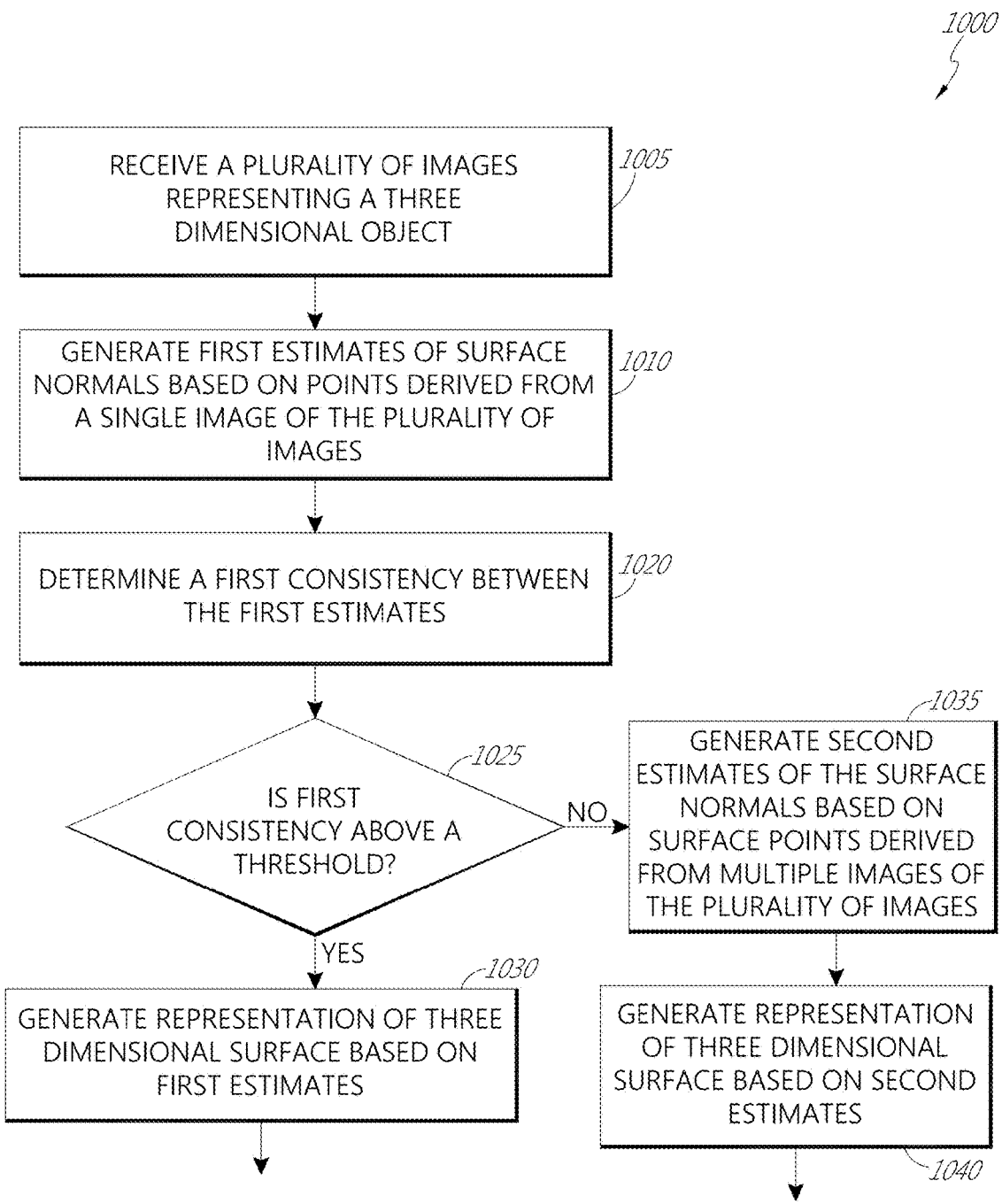
FIG. 10 is a flowchart illustrating an example of an embodiment of a method for three dimensional surface reconstruction.

FIG. 10 is a flowchart of an exemplary process for three dimensional surface reconstruction. In some aspects, the process 1000 may be performed by the device 700, discussed above with respect to FIG. 7. For example, instructions in one or more of the modules discussed above with respect to FIG. 7 may configure the processor 705 to perform one or more of the functions discussed below.

In block 1005, a plurality of images are received. In some aspects, the images may be received from the imaging sensor 720. In other aspects, the images may be received from the stable storage 715. In some other aspects, the images may be received from a computer network. Each of the plurality of images includes a representation of the same three dimensional object. Each image may represent the object from a different viewpoint. For example, the images may represent the three dimensional object from a different position on a X, Y, or Z axis, with the center of the object positioned at the intersection of the X, Y, and Z axis in some aspects. In some aspects, a plurality of depth maps corresponding to the plurality of images may be received. In some aspects only the plurality of depth maps is received. In some aspects, block 1005 may receive only a single image.

In block 1010, first estimates are generated for surface normals based on surface points from a single first image of the plurality of images. As discussed above, in some aspects, the surface normals may be estimated by taking a vector cross product of two edges of a triangle formed by at least three surface points on the surface of the three dimensional object in three dimensional space. In some aspects, multiple triangles (i.e. multiple sets of at least three surface points on the surface of the three dimensional object) may be identified from a plurality of surface points within the three dimensional space. The vector cross products resulting from each of the identified triangles (sets of surface points) may be averaged to determine the surface normal in some aspects. In some aspects, block 1010 may operate similarly to block 815, discussed above with respect to FIG. 8.

Block 1010 may include deriving a plurality of surface points on the surface of a three dimensional object. In some aspects, the plurality of surface points may comprise 2, 3, 4, 5, 10, 20, 50, 100, or 1,000 surface points, or any number of surface points. Block 1010 may also include generating surface normals at positions of two or more of the determined surface points.

In block 1020, a first consistency measurement is determined between the first estimates. For example, in some aspects, the consistency measurement may determine to what extent the surface normals estimated by the first estimates are parallel. The parallelism of two surface normals may be computed, in some aspects, based on an inner product of the normals. If the inner product is zero (0), the two vectors (normals) are orthogonal, while if the inner product is at a maximum value then the two vectors (normals) may be more parallel.

Decision block 1025 determines if the first consistency measurement is above a threshold. In these aspects, a higher consistency measurement represents more parallel surface normals, while a lower consistency measurement represents less parallel surface normals. If the consistency is above the threshold, process 1000 moves to block 1030, where a three dimensional surface is estimated based on the first estimates. If the consistency is below the threshold, process 1000 moves to block 1035, which generates second estimates of the surface normals based on surface points derived from multiple images of the plurality of images. As discussed above, the second estimates may be subject to variability introduced by misalignment between the first, second, and/or other images of the plurality of images, to the extent surface points from these images are utilized in generating the surface normal estimates. However, the increased number of surface points available from the multiple images may have positive effects on the surface normal estimation in some imaging environments. For example, if surface points from the first image were limited due to shadowing of the three dimensional object, incorporating surface points from other images and/or depth maps may improve the accuracy of surface normal estimation.

Blocks 1030 and block 1040 may generate the representation of the three dimensional surface by filling in the surface between surface points identified in each of the plurality of images. The fill process may be based, in part, on the estimates generated by either block 1010 (for block 1030) or block 1035 (for block 1040).

For example, a surface may be represented as a level surface of a volumetric indicator function. Similar to the contour lines on a topographic map, each pixel on the 2D map may also indicate an altitude at that point. If points with similar altitudes are grouped via contour lines, lines in the altitude dimension result. Filling in the surface of the object may be considered to be similar to this process, but may utilize the additional depth dimension. Each voxel in the image may include a depth value for the voxel. If voxels with similar depth values are linked together, a surface results. With an indicator function providing a value of one (1) inside the object and zero (0) everywhere else, then the constant=0.5 may produce the object surface, at least in some embodiments.

After the surface representation is generated, process 1000 may write the representation to an output device, such as an electronic display (e.g. display 725), stable storage (e.g. storage 715) or network.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the FIGS. may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of generating, by an electronic device, a representation of a three dimensional surface for an object, comprising:
    receiving, by a processor of the electronic device, an image and a corresponding depth map of the object for each of a plurality of viewpoints;
    from each of the plurality of images and corresponding depth maps:
        deriving, by the processor, one or more surface points of the object in a three dimensional space; and
        estimating, by the processor, one or more surface normals,
    wherein each surface normal is at a location of a surface point derived from the image and corresponding depth map;
    generating, by the processor, a point cloud comprising the surface points from each of the plurality of images and corresponding depth maps; and
    generating, by the processor, the representation of the three dimensional surface for the object based on the one or more surface normals and the point cloud, wherein the representation is configured for display on an electronic display.

2. The method of claim 1, further comprising rendering the representation on the electronic display or storing the representation in a memory of the electronic device.

3. The method of claim 1, wherein estimating the one or more surface normals includes, for a first surface point from a first image and corresponding depth map from the plurality of images and corresponding depth maps;
    determining a number of other surface points from the first image and corresponding depth map with locations in the three dimensional space that are within a neighborhood of a location of the first surface point;
    determining whether the number of other surface points exceeds a number threshold;
    estimating a first surface normal at the location of the first surface point based on the other surface points from the first image and corresponding depth map in response to determining that the number of other surface points exceeds the number threshold; and
    estimating the first surface normal based on surface points from one or more other images and corresponding depth maps from the plurality of images and corresponding depth maps in response to determining that the number of other surface points does not exceed the number threshold.

4. The method of claim 1, wherein:
    deriving one or more surface points of the object includes:
        deriving, from a first image and corresponding depth map from the plurality of images and corresponding depth maps, a first plurality of surface points; and
        deriving, from one or more other images and corresponding depth maps from the plurality of images and corresponding depth maps, a second plurality of surface points; and
    estimating one or more surface normals includes:
        determining, for one or more first surface points of the first plurality of surface points, a first estimate of a first surface normal at a location of the first surface point in the three dimensional space and based on the first plurality of surface points;

determining a consistency between the first estimates:
  determining that the consistency does not exceed a consistency threshold, wherein deriving the second plurality of surface points is in response to determining that the consistency does not exceed the consistency threshold, and
  in response to determining that the consistency does not exceed the consistency threshold, determining, for the one or more first surface points of the first plurality of surface points, a second estimate of the first surface normal based on the second plurality of surface points.

5. The method of claim 4, wherein the consistency between the first estimates is based on an in inner product of at least two first estimates.

6. The method of claim 1, wherein a corresponding depth map includes distances from the surface of the object determined from at least one from the group consisting of:
  a stereoscopic image;
  a structured light depth sensing; and
  a time of flight depth sensing.

7. The method of claim 6, wherein the one or more surface points are based on distances.

8. An electronic device configured to generate a representation of a three dimensional surface for an object, comprising;
  a processor; and
  a memory storing instructions that, when executed by the processor, cause the processor to:
    receive an image and a corresponding depth map of the object for each of a plurality of viewpoints;
    from each of the plurality of images and corresponding depth maps:
      derive one or more surface points of the object in a three dimensional space; and
      estimate one or more surface normals, wherein each surface normal is at a location of a surface point derived from the image and corresponding depth map;
    generate a point cloud comprising the surface points from each of the plurality of images and corresponding depth maps; and
    generate the representation of the three dimensional surface for the object based on the one or more surface normals and the points cloud, wherein the representation is configured for a display on an electronic display.

9. The electronic device of claim 8, wherein the instructions cause the electronic device to render the representation on the electronic display or store the representation in a non-transient electronic storage.

10. The electronic device of claim 8, wherein the instructions for estimating one or more surface normals cause the processor to, for a first surface points from a first image and corresponding depth amp from the plurality of images and corresponding depth maps;
  determine a number of other surface points from the first image and corresponding depth map with locations in the three dimensional space that are within a neighborhood of a location of the first surface point;
  determine whether the number of other derived surface points exceeds a number threshold,
  estimate a first surface normal at the location of the first surface point based on the other surface points from the first image and corresponding depth map in response to determining that the number of other surface points exceeds the number threshold; and
  estimate the first surface normal based on surface points from one or more other images and corresponding depth maps from the plurality of images and corresponding depth maps in response to determining that the number of other surface points does not exceed the number threshold.

11. The electronic device of claim 8, wherein,
the instructions for deriving one or more surface points of the object cause the processor to:
  derive, from a first image and corresponding depth map from the plurality of images and corresponding depth maps, a first plurality of surface points; and
  derive, from one or more other images and corresponding depth maps from the plurality of images and corresponding depth maps, a second plurality of surface points; and
the instructions for estimating one or more surface normals cause the processor to:
  determine, for one or more first surface points of the first plurality of surface points, a first estimate of a first surface normal at a location of the first surface point in the three dimensional space and based on the first plurality of surface points;
  determine a consistency between estimates;
  determine that the consistency does not exceed a consistency threshold, wherein the instructions cause the processor to derive the second plurality of surface points in response to determining that the consistency does not exceed the consistency threshold; and
  in response to determining that the consistency does not exceed the consistency threshold, determine, for the one or more first surface points of the first plurality of surface points, a second estimate of the first surface normal based on the second plurality of surface points.

12. The electronic device of claim 11, wherein the consistency between the first estimates is based on an inner product of at least two first estimates.

13. The electronic device of claim 8, wherein a corresponding depth map includes distances from the surface of the object determined from at least one from the group consisting of:
  a stereoscopic image;
  a structured light depth sensing; and
  a time of flight depth sensing.

14. A non-transitory computer readable storage medium comprising instructions for generating a representation of a three dimensional surface for an object that, when executed by a processor of an electronic device, cause the processor to:
  receive an image and a corresponding depth map of the object for each of a plurality of viewpoints;
  from each of the plurality of images and corresponding depth maps:
    derive one or more surface points of the object in a three dimensional space; and
    estimating one or more surface normals, wherein each surface normal is at a location of a surface point derived from the image and corresponding depth map;
  generate a point cloud comprising the surface points from each of the plurality of images and corresponding depth maps; and
  generate the representation of the three dimensional surface for the object based on the one or more surface normals and the point cloud, wherein the representation is configured for display on an electronic display.

15. The computer readable storage medium of claim 14, wherein the instructions for estimating one or more surface normals cause the processor to, for a first surface point from a first image and corresponding depth map from the plurality of images and corresponding depth maps:
- determine a number of other derived surface points from the first image and corresponding depth map from the plurality of images and corresponding depth maps with locations in the three dimensional space that are within a neighborhood of a location of the first surface point; and
- determine whether the number of other surface points exceeds a number threshold;
- estimate a first surface normal at a location of the first surface point based on other derived surface points from the first image and corresponding depth map in response to determining that the number of other derived surface points exceeds the number threshold, and
- estimate the first surface normal based on surface points from one or more other images and corresponding depth maps from the plurality of images and corresponding depth maps in response to determining that the number of other surface points does not exceed the number threshold.

16. The computer readable storage medium of claim 15, wherein:
- the instructions for deriving one or more surface points of the object cause the processor to:
  - derive, from a first image and corresponding depth map from the plurality of images and corresponding depth maps, a first plurality of surface points; and
  - derive, from one or more other images and corresponding depth maps from the plurality of images and corresponding depth maps, a second plurality of surface points; and
- the instructions for estimating one or more surface normals cause the processor to:
  - determine, for one or more first surface points of the first plurality of surface points, a first estimate of a first surface normal at a location of the first surface point in the three dimensional space and based on the first plurality of surface points;
  - determine a consistency between the first estimates;
  - determine that the consistency does not exceed a consistency threshold, wherein the instructions cause the processor to derive the second plurality of a surface points in response to determining that the consistency does not exceed the consistency threshold, and
  - in response to determining that the consistency does not exceed the consistency threshold, determine, for the one or more first surface points of the first plurality of surface points, a second estimate of the first surface normal based on the second plurality of surface points.

17. The computer readable storage medium of claim 16, wherein the consistency between the first estimates is based on an inner product of at least two first estimates.

18. The computer readable storage medium of claim 15, wherein a corresponding depth map includes distances from the surface of the object determined from at least one from the group consisting of:
- a stereoscopic image;
- a structured light depth sensing; and
- a time of flight depth sensing.

19. A device for generating a representation of a three dimensional surface for an object, comprising;
- means for receiving an image and a corresponding depth map of the object for each of a plurality of viewpoints;
- from each of the plurality of images and corresponding depth maps:
  - means for deriving one or more surface points of the object in a three dimensional space; and
  - means for estimating one or more surface normals, wherein each surface normal is at a location of a surface point derived from the image and corresponding depth map;
- means for generating a point cloud comprising the surface points from each of the plurality of images and corresponding depth maps; and
- means for generating the representation of the three dimensional surface for the object based on the one or more surface normals and the point cloud, wherein the representation is configured for display on an electronic display.

20. The device of claim 19, further comprising at least one from the group consisting of:
- means for rendering the representation on the electronic display; and
- means for storing the representation in a memory.

21. The device of claim 19, wherein the means for estimating one or more surface normals includes:
- means for determining, for a first surface point from a first image and corresponding depth map from the plurality of images and corresponding depth maps, a number of other surface points from the first image and corresponding depth map with locations in the three dimensional space that are within a neighborhood of a location of the first surface point;
- means for determining whether the number of other surface points exceeds a number threshold;
- means for generating an estimate of a first surface normal at the location of the first surface point based on the other surface points from the first image and corresponding depth map in response to determining that the number of other surface points exceeds the number threshold; and
- means for generating the estimate of the first surface normal based on surface points from one or more other images and corresponding depth maps from the plurality of images and corresponding depth maps in response to determining that the number of other surface points does not exceed the number threshold.

22. The device of claim 19, wherein:
- the means for deriving one or more surface points of the object includes:
  - means for deriving, from a first image and corresponding depth map from the plurality of images and corresponding depth maps, a first plurality of surface points; and
  - means for deriving, from one or more other images and corresponding depth maps from the plurality of images and corresponding depth maps, a second plurality of surface points; and
- the means for estimating one or more surface normals includes:
  - means for determining, for one or more first surface points of the first plurality of surface points, a first estimate of a first surface normal at a location of the first surface point in the three dimensional space and based on the first plurality of surface points;
  - means for determining a consistency between the first estimates;

means for determining that the consistency does not exceed a consistency threshold, wherein deriving the second plurality of surface points is in response to determining that the consistency does not exceed the consistency threshold; and means for determining for the one or more first surface points of the first plurality of surface points, in response to determining that the consistency does not exceed the consistency threshold, a second estimate of the first surface normal based on the second plurality of surface points.

23. The device of claim 22, wherein the consistency between the first estimates is based on an inner product of at least two first estimates.

24. The device of claim 19, wherein a corresponding depth map includes distances from the surface of the object determined from at least one from the group consisting of:

a stereoscopic image;
a structured light depth sensing; and
a time of flight depth sensing.

* * * * *